April 7, 1964 F. P. SHARPE 3,127,981
RECIPROCATING PUSHER-TYPE CONVEYOR
Filed May 2, 1960 12 Sheets-Sheet 1

INVENTOR.
Frederick P. Sharpe.
BY
Harness, Dickey & Pierce
ATTORNEYS.

April 7, 1964 F. P. SHARPE 3,127,981
RECIPROCATING PUSHER-TYPE CONVEYOR
Filed May 2, 1960 12 Sheets-Sheet 10

Fig. 14.

INVENTOR.
Frederick P. Sharpe
BY
Harness, Dickey & Pierce
ATTORNEYS

United States Patent Office 3,127,981
Patented Apr. 7, 1964

3,127,981
RECIPROCATING PUSHER-TYPE CONVEYOR
Frederick P. Sharpe, Dearborn, Mich., assignor to Kelsey-Hayes Company, Detroit, Mich., a corporation of Delaware
Filed May 2, 1960, Ser. No. 26,052
7 Claims. (Cl. 198—221)

This invention relates to transfer mechanisms and, particularly, to a transfer mechanism for moving workpieces between work stations in a manufacturing operation.

It is an object of the present invention to provide a transfer mechanism operable to stack a plurality of workpieces into separate piles as the workpieces emerge from a first work station and to advance said piles successively to a position in which the workpieces may be fed from the piles to a second work station.

It is another object of the present invention to provide a transfer mechanism of the above character in which the stacks of workpieces are incrementally advanced through a series of positions and in which each stack is automatically advanced to the next succeeding position upon the removal of the preceding stack therefrom.

It is still another object of the present invention to provide a transfer mechanism having a reciprocating shuttle for incrementally advancing work through a series of separate positions in which simple, inexpensive and reliable means are provided for preventing the movement of work into a position which is already occupied.

It is a still further object of the present invention to provide a transfer mechanism for moving workpieces between a pair of work stations in which a large volume of workpieces may be installed on the transfer mechanism and in which workpieces may be conveniently removed from or inserted in the transfer mechanism to compensate for variations in the production rate between the work stations.

It is still another object of the present invention to provide an inexpensive, rugged and relatively simple transfer mechanism for handling heavy workpieces, such as heavy sheet metal blanks.

It is still another object of the present invention to provide a transfer mechanism of the above character having means for successively advancing stacks of workpieces to a de-piling position and successively raising the stack in said de-piling position to maintain the topmost workpiece or workpieces thereof at a predetermined height for removal from the stack by a de-piling mechanism.

It is a still further object of the present invention to provide a transfer mechanism usable with sheet metal blanks of circular shape in which the mechanism is provided with work engaging and pushing members adapted both to move the blanks along a work supporting surface and also to maintain the lateral alignment and position of the workpiece on the work supporting surface without the use of other work guiding or alignment means on the work supporting surface.

These and other objects and advantages of the present invention will become apparent from the following detailed description taken in conjunction with the accompanying drawings wherein:

FIG. 3 is an elevational view with parts removed of the structure illustrated in FIG. 1;

FIG. 4 is an elevational view with parts removed of the structure illustrated in FIG. 2 and is intended to be read together with FIG. 3 by placing FIG. 4 at the left-hand end of FIG. 3 and aligning the lines X—X of said views;

FIGS. 5, 6 and 7 are enlarged sectional views of structure illustrated in FIG. 1 taken along the lines 5—5, 6—6 and 7—7 thereof, respectively;

FIG. 16 is a wiring diagram of control mechanism used in connection with the structure shown in FIGS. 1–15.

Referring now to the drawings and, particularly, to FIGS. 1–4, the transfer mechanism of the present invention will be seen as including a work supporting structure 20 having a pair of spaced, parallel I-beams 21 and 22. The I-beams 21 and 22 carry a pair of spaced, parallel rails 23 and 24 having work supporting surfaces 25 and 26, respectively, on which the workpieces are adapted to be supported for sliding movement longitudinally of the supporting structure. Supported between the I-beams 21 and 22 is an elongated shuttle mechanism 27 including a pair of spaced, parallel side frame members 28 and 29. The side frame members are rigidly interconnected by means of a plurality of longitudinally spaced cross rods 30. The side frame members 28 and 29 rest on a plurality of longitudinally spaced supporting rollers 31 supported by the I-beams 21 and 22, respectively, for rotation about a horizontal axis disposed transversely of the longitudinal axis of the shuttle 27. Additionally, the shuttle 27 is confined between side rollers 32, also secured to the I-beams 21 and 22 at locations spaced along the length thereof. The shuttle 27 is adapted to be reciprocated back and forth longitudinally of the supporting structure for the purpose of advancing workpieces resting on the rails 25 and 26 down the length thereof and power for said movement is supplied by means of a motor 33 (FIG. 3). Rotary power is supplied from the motor 33 through a speed reducing transmission 34 to a drive sprocket 35. The drive sprocket 35 drives a chain 36 which is connected to a driven sprocket 37 fastened to a shaft 38. Also fastened to the shaft 38 is a crank 39 which is pivotally connected at its outer end to one end of a connecting rod 40. The opposite end of the connecting rod 40 is pivotally joined to an end 41 of the shuttle 27 by means of a clevis 42. An adjustable chain tensioning mechanism is shown at 43 for maintaining the proper driving tension on the chain 36. Thus, upon rotation of the crank 39 by the motor 33, the shuttle 27 will be reciprocated back and forth longitudinally of the rails 25 and 26.

Figure 7:
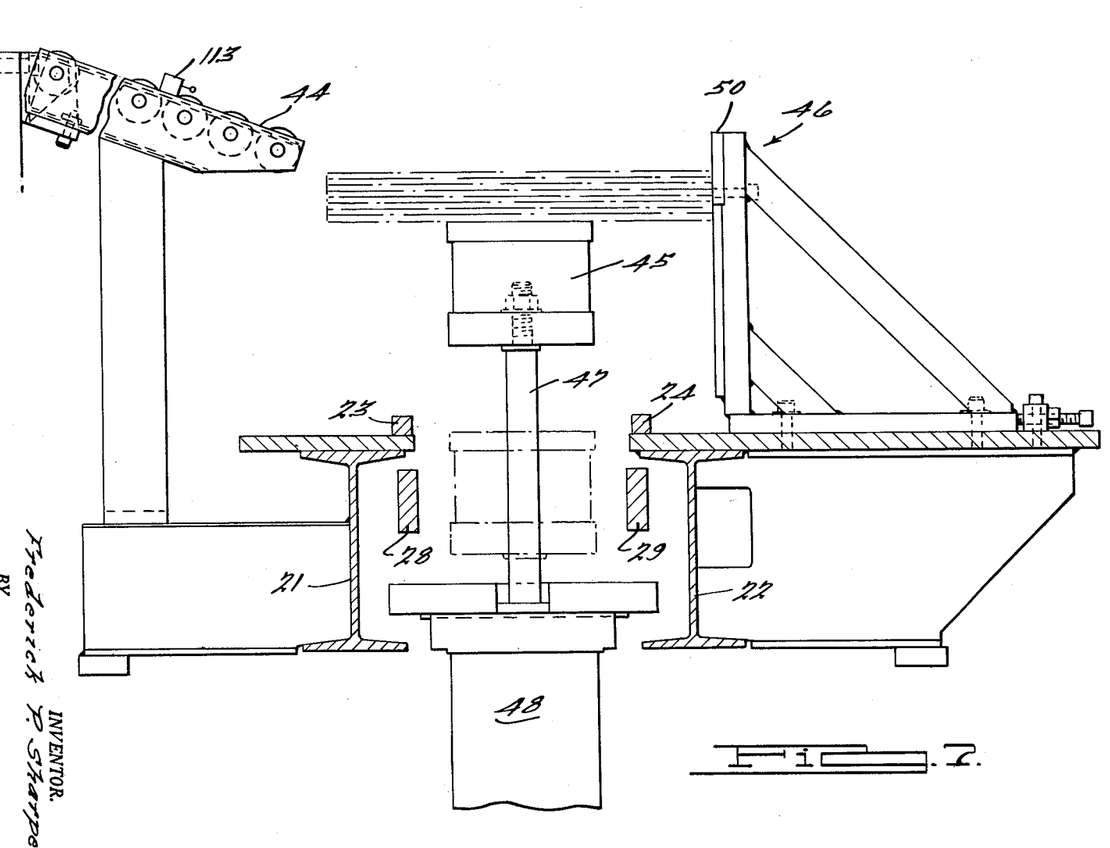
Figures 8, 9:
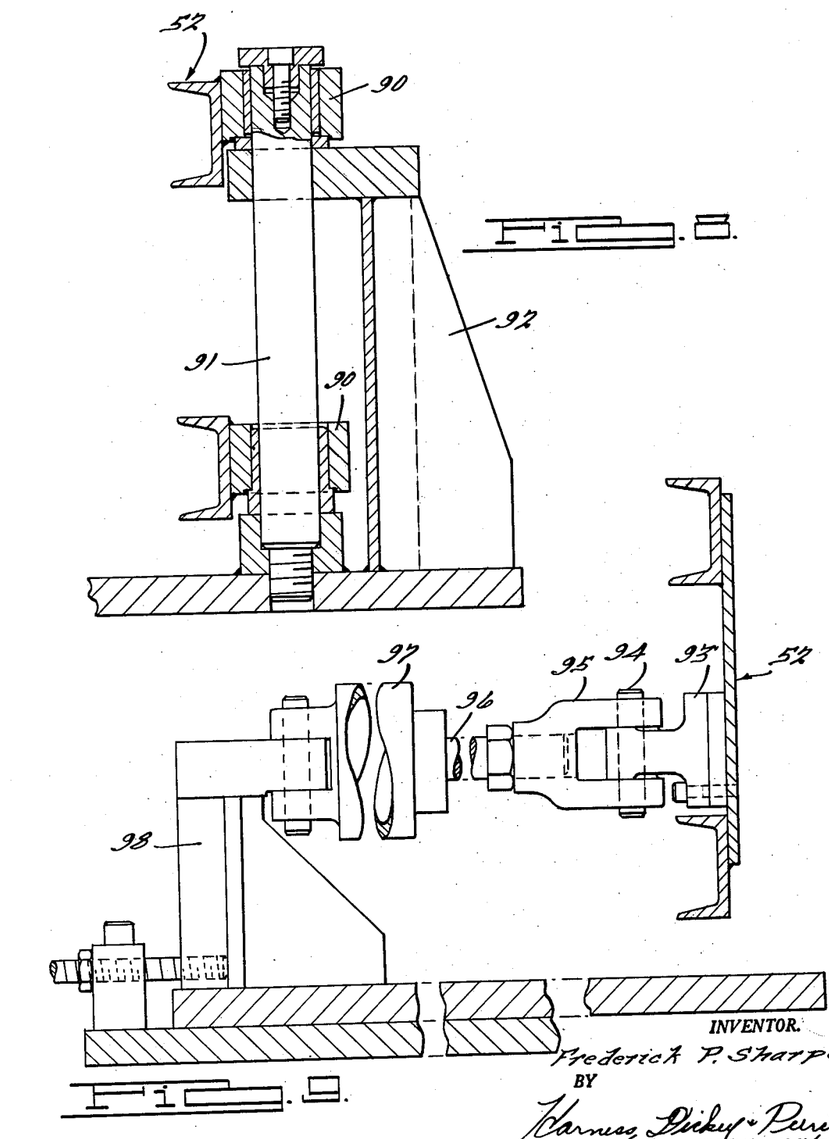
FIGS. 8, 9 and 10 are enlarged sectional views of portions of the structure illustrated in FIG. 2 taken along the lines 8—8, 9—9 and 10—10, respectively.

While the transfer mechanism of the present invention may be utilized for the handling of a variety of different workpieces, the mechanism is illustrated herein as handling workpieces in the form of centrally apertured heavy sheet metal disks. The mechanism is shown as being arranged to receive individual workpieces or blanks from a first work station, an unloading chute of which is shown at 44 in FIG. 7. As the workpieces descend from the chute 44, they fall onto and are supported by a work receiving platform 45, which forms a part of a work receiving assembly, generally indicated by the number 46. The platform 45 is supported at the upper end of a vertically movable rod 47, which is driven by the piston on an air cylinder 48. By suitable regulation of the air cylinder 48, the platform 45 may be raised to a position spaced slightly below the upper end of the chute 44 or may be lowered to the position shown in phantom at 49 to permit the entire pile formed on the platform 45 to come to rest on the rails 23 and 24. The work receiving assembly 46 additionally includes means for confining the workpieces as they fall onto the platform 45 and for forming said workpieces into neat, vertically aligned piles. Such mechanism includes a radially adjustable upright supporting post 50, a radially adjustable upright post 51 and a pivotally mounted gate 52. The posts 50 and 51 and the gate 52 engage the workpieces at substantially equally spaced locations therearound and generally define an enclosure within which the workpieces are vertically aligned.

After a pile of workpieces of a predetermined height has been formed at the work receiving assembly 46, the pile is adapted to be moved down the rails 23 and 24 of the supporting structure to a work dispensing assembly, generally indicated at 53, at which location each pile is lifted by means of a platform 54. The platform 54 is supported at the upper end of a rod 55, which is driven by the piston of an air cylinder 56. The air cylinder 56 is suitably regulated to incrementally raise the platform 54 to present the uppermost workpiece or workpieces to a pusher mechanism, indicated at 57, which successively slides the uppermost workpiece or workpieces off of the pile onto a supporting member 58 forming a part of a second work station intended to be fed by the mechanism of the present invention.

Figures 1, 2:
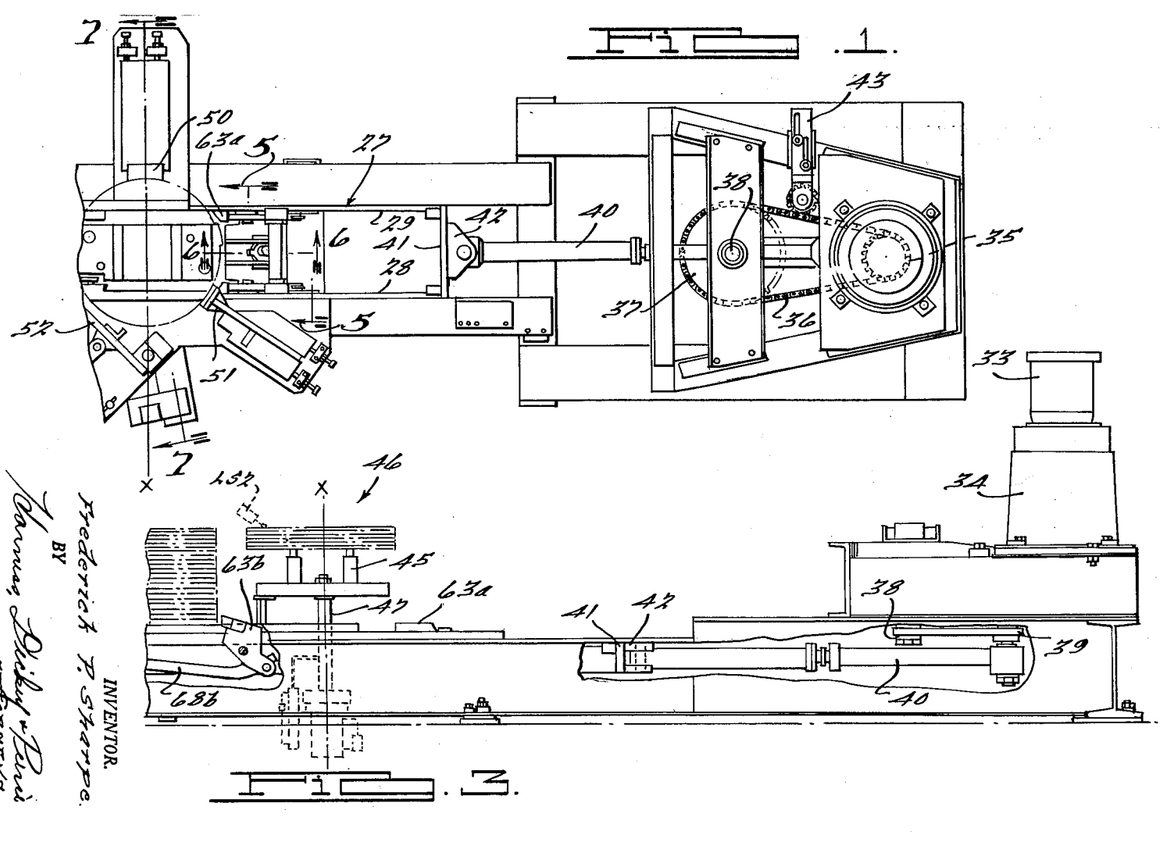
FIGURE 1 is a plan view of a portion of a transfer mechanism embodying the principles of the present invention.
FIG. 2 is a plan view of the remaining portion of the transfer mechanism illustrated in FIG. 1 and should be read together with FIG. 1 by placing FIG. 2 at the left-hand end of FIG. 1 and aligning the lines X—X thereof.
Figure 15:
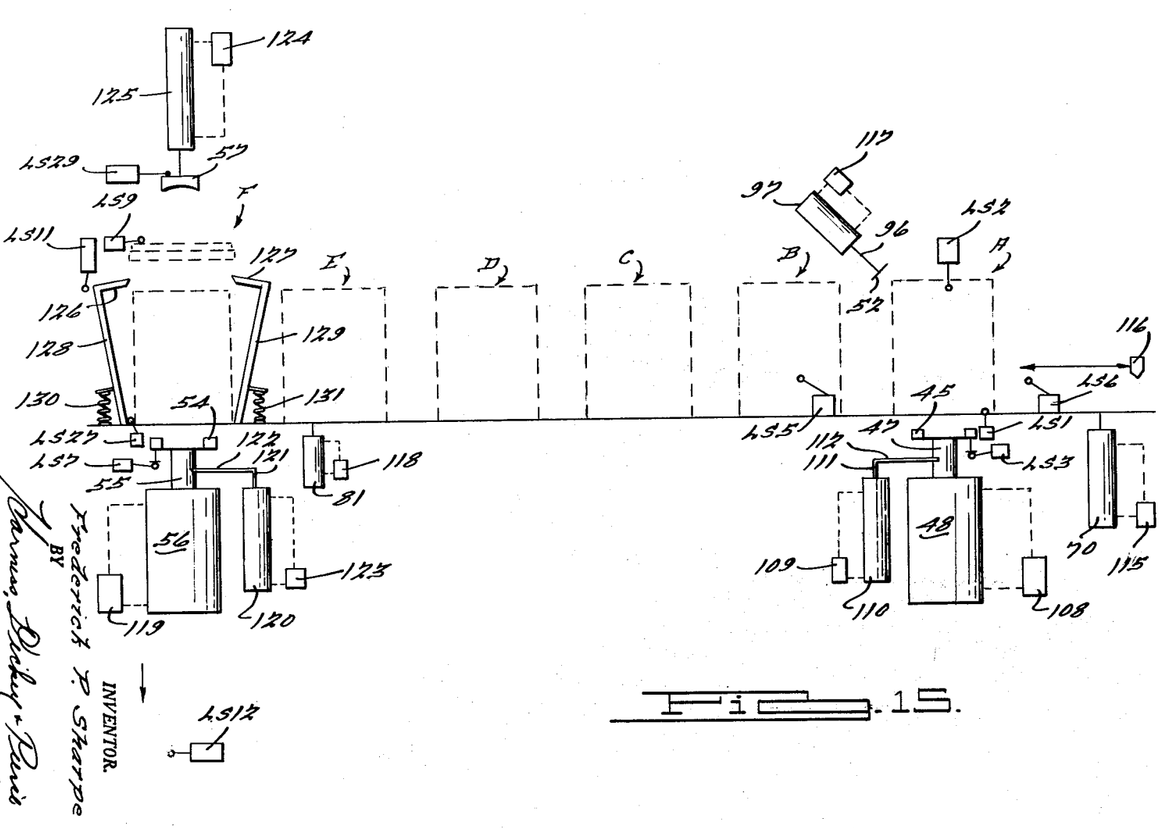
FIG. 15 is a diagrammatic view of the transfer mechanism shown in FIGS. 1–14 and, particularly, showing the location of the limit switches and power cylinders.
Figure 18:
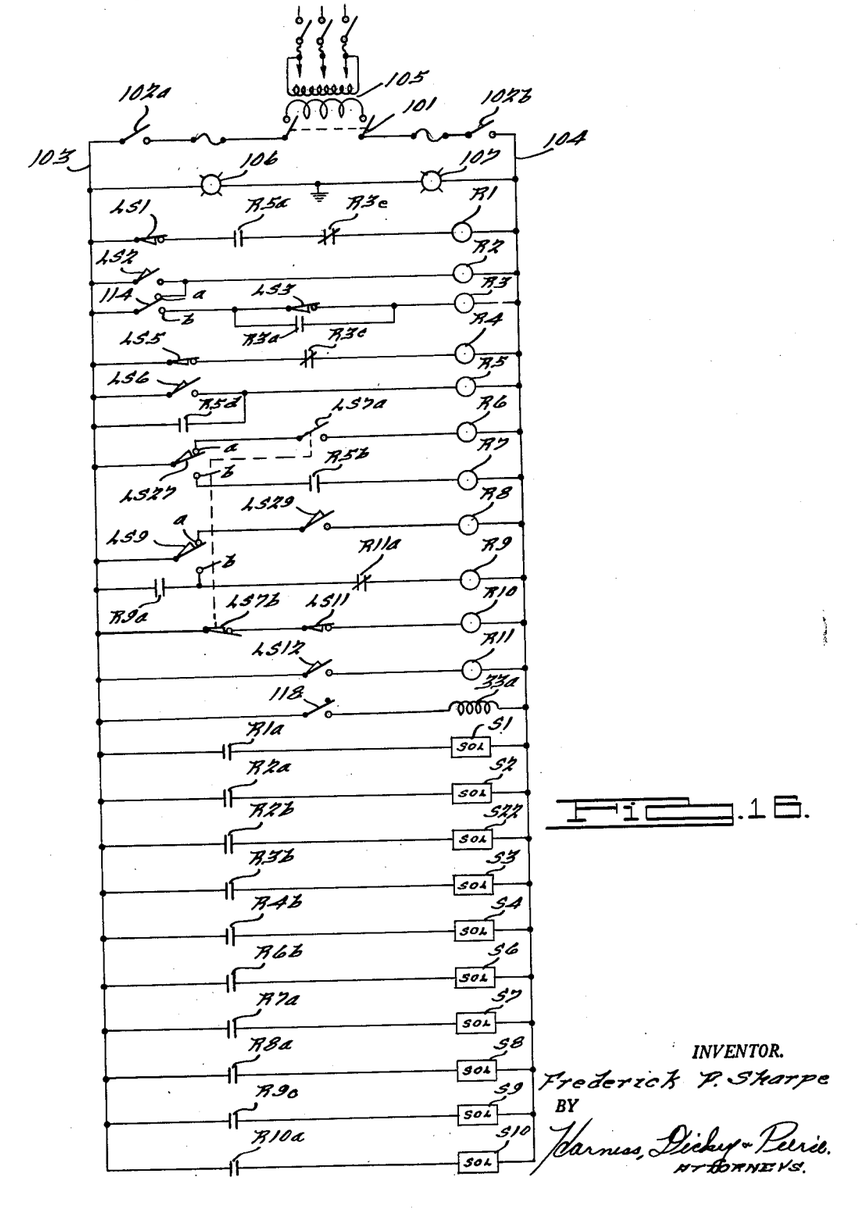

The mechanism of the present invention is designed to incrementally advance separate stacks of workpieces down the rails 23 and 24 from the work receiving assembly 46 to the work dispensing assembly 53. As may be seen best in FIGS. 1, 2 and 16, there exist a number of intermediate positions between said work receiving assembly 46 and work dispensing assembly 53 in which workpieces may rest. The number of intermediate positions is entirely discretionary and any desired number may be selected in accordance with the distance over which it is desired to transport the piles of workpieces, the size of the workpieces, and other factors. Each intermediate position represents the position to which a pile of workpieces is moved by the shuttle at the end of the forward movement of the shuttle upon the reciprocation thereof. By way of illustration only, the mechanism of the present invention is shown as having six separate positions to or from which stacks of workpieces are moved, including four intermediate positions. The first position is that to which the pile is lowered by the platform 45 of the work receiving assembly 46, and for convenience is identified by the letter A (FIGS. 2 and 15). The last position is in alignment with the platform 54 of the work dispensing assembly 53, and for convenience is identified by the letter F. The second, third, fourth and fifth positions, which are intermediate said first and last positions, are identified by the letters B, C, D and E, respectively.

Figure 5:
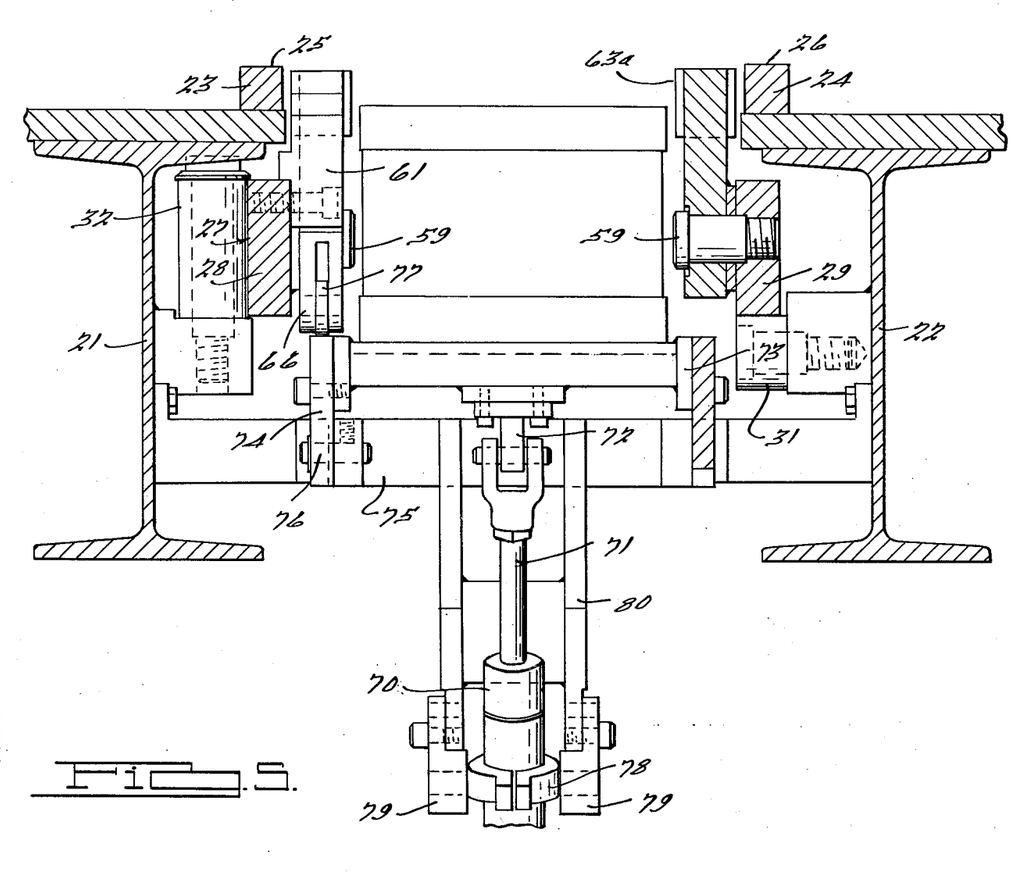
Figure 10:
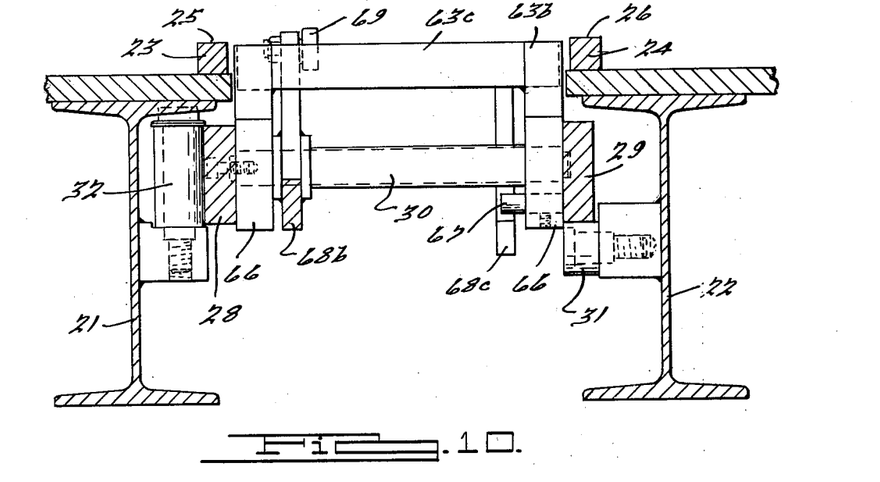

As has been previously mentioned, the reciprocation of the shuttle 37 is effective to advance the piles of workpieces successively through the above-identified positions on the rails 23 and 24. The mechanism carried by the shuttle 37 which performs this function includes a series of pivotally mounted dogs or pusher members 63a, 63b, 63c, 63d and 63e which engage the stacks of workpieces resting in positions A, B, C, D and E, respectively. Each of the dogs 63a, 63b, etc., includes a pair of spaced fingers 64 having inwardly and rearwardly converging shoulders 65 adapted to engage a stack of workpieces on opposite sides thereof and slide the stack along the rails 23 and 24. The arrangement of the shoulders serves to center the stack of workpieces on the supporting structure 20 and to prevent the stacks from being pushed laterally off of the supporting structure. Thus, it has been found that no supplementary workpiece guiding or alignment means is necessary on the supporting structure 20. The dogs 63b, 63c and 63d are supported on separate cross rods 30, while the dogs 63a and 63e are supported by pairs of pivot pins 59 and 60, respectively. Each of the dogs 63a, 63b, etc., is provided with a pair of rearwardly depending arms 66 which are of a combined greater weight than that portion of the dogs forwardly of the pivot axis thereof and which normally maintain the dogs in a position with the fingers 64 raised above the level of the rail supporting surfaces 25 and 26. However, when the arms 66 are moved upwardly, the fingers 64 are pivoted downwardly and forwardly to a position beneath the level of the rail supporting surfaces 25 and 26 to permit them to clear beneath the workpieces resting on the rails 23 and 24 and the dogs are thereby prevented from moving the workpieces which they would otherwise advance. The upward movement of the arms 66 is limited by engagement with an abutment member 61 secured to the shuttle side frame member 28. As is illustrated in FIG. 10, one of the arms 66 of each of the dogs 63b, 63c and 63d is provided with an inwardly projecting pin 67 adapted to be contacted by the rear end of a lever arm 68b, 68c and 68d. The levers 68b and 68c are pivoted on a cross rod 30 next ahead of the dogs 63b and 63c which they control. The arm 68d is pivoted on the one of a pair of pins 60 which also serve to pivotally support the dog 63e. As may be seen in FIG. 2, the lever arms 68b and 68d are disposed on one side of the shuttle, while the lever arm 68c is on the other side, thus providing interference between the lever arms. Each of the lever arms 68b, 68c and 68d carries a roller 69 at the forward end thereof normally above the level of the rail supporting surfaces 25 and 26 due to the greater length and weight of the lever arms rearwardly of the pivot axis thereof. However, when a pile of workpieces rests in positions C, D or E, the rollers of the lever arms 68b, 68c and 68d, respectively, will ride along the bottom or under said piles and the rear ends of said lever arms will be raised to lower the dogs 63b, 63c or 63d. The mechanism for controlling the position of dog 63a, which is operable to move a stack in position A, is shown in FIG. 5 and includes an air cylinder 70 having a piston rod 71 pivotally connected to an eye member 72 bolted to the bottom of a riser member 73. The riser member 73 is provided with depending apertured ears 74 pivotally connected to a frame member 75 by pivot pins 76. The frame member 75 is in turn secured to the beams 21 and 22. The rear arms 66 of the dog 63a are provided with rollers 77 which ride over the top surface of the riser member when the riser member is pivotally raised by the cylinder 70, which causes the dog 63a to pivot about the pivot pin 59 on which it is mounted and thereby causes the fingers 64 of the dog 63a to pivot downwardly and forwardly so as to clear beneath the stack of workpieces in position A. The air cylinder 70 is supported by means of a clamp 78 trunnioned between a pair of brackets 79 which are in turn pivotally connected to a bifurcated supporting frame 80 rigidly secured to the supporting frame 75.

Figure 11:
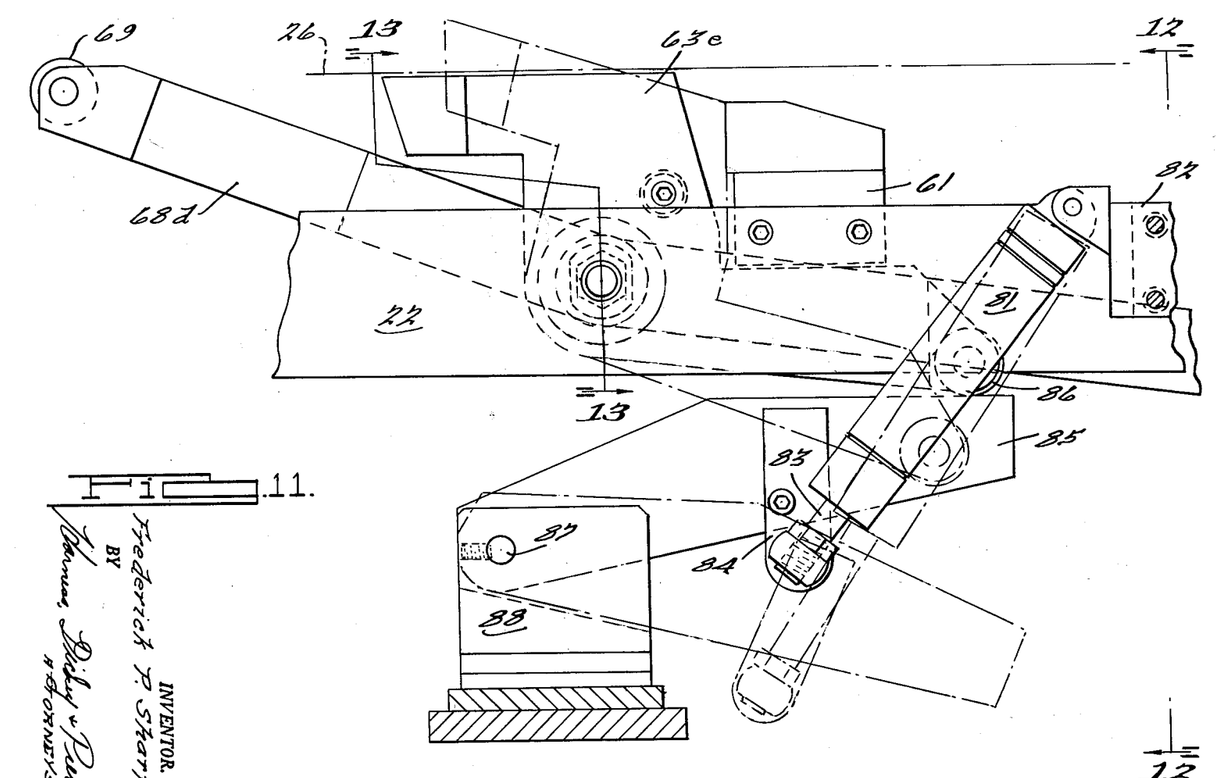
FIG. 11 is an enlarged view of a portion of the structure illustrated in FIG. 2 taken along the line 11—11 thereof.
Figure 12:
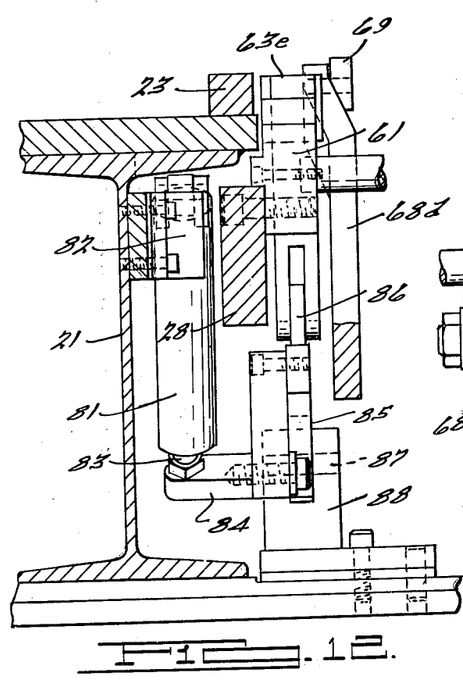
FIGS. 12 and 13 are sectional views of the structure illustrated in FIG. 11 taken along the lines 12—12 and 13—13 thereof.
Figure 13:
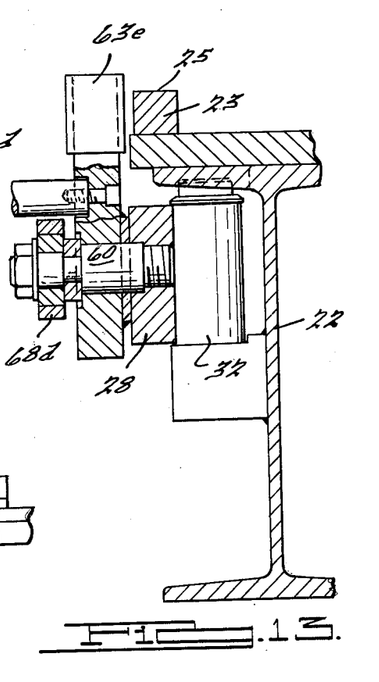
Figure 14:
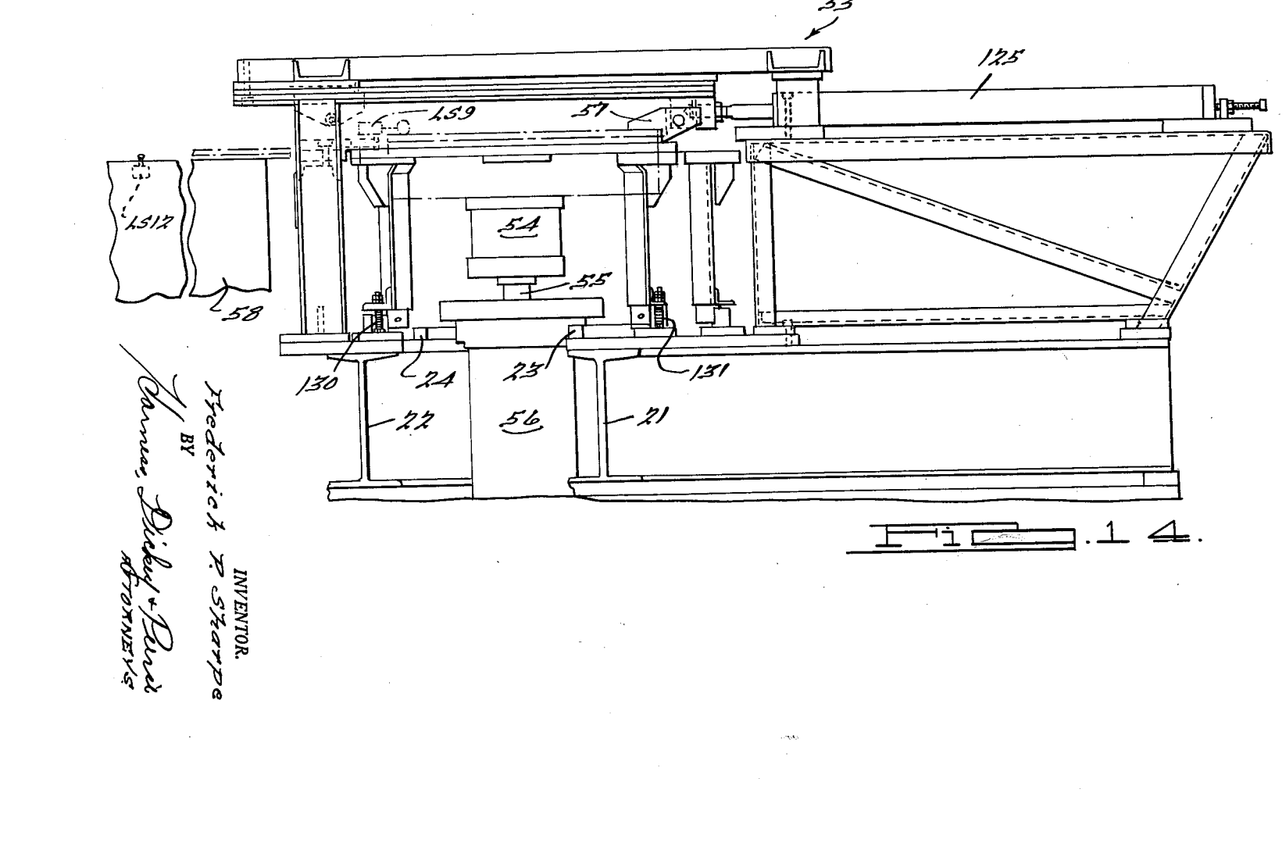
FIG. 14 is a view of the structure illustrated in FIG. 2 taken from the line 14—14 thereof and looking in the direction of the arrows.

The mechanism for actuating the dog 63e is illustrated in FIG. 11 and includes an air cylinder 81 pivotally connected at its one end to a bracket 82 bolted to the I-beam 21. The piston rod 83 of the cylinder 81 is pivotally connected to an arm 84 fastened to a riser plate 85. Upon retraction of the piston rod 83, the riser plate will be pivoted upwardly to the position shown in solid lines in FIG. 11. In this position, a roller 86 carried at the end of one of the rear arms 66 of the dog 63e will ride over the top surface of the riser plate 85 and cause the fingers 64 of the dog 63e to pivot downwardly and forwardly beneath the level of the rail surfaces 25 and 26, thus preventing the movement of a stack of workpieces out of position E. The riser plate 85 is pivotally supported at 87 by a supporting block 88.

As may be seen in FIG. 2, the normal position of the gate 52 is such as to obstruct the movement of work from position A to position B. For this reason, the gate 52 is provided with a pair of apertured ears 90 pivoted on a hinge 91 supported in a vertical position by a bracket 92. In addition, an eyelet 93 is secured to the back of the gate for the reception of a pin 94. A clevis 95, secured to the end of a piston rod 96 of an air cylinder 97, is pivotally connected to the pin 94 for the operation of the gate 52. The air cylinder is pivotally supported at its rear end by an adjustable bracket 98. Thus, upon the extension of the piston rod 96, the gate 52 will be closed (to the position shown in FIG. 2) and upon the retraction of the piston rod 96, the gate will be opened to be clear of workpieces moved from position A to position B.

As may be seen in FIG. 4, the intermediate workpiece positions are completely open and readily accessible for the removal of work therefrom or the installation of work thereon. A lifting rod 99 having locking tabs 100 is shown in FIG. 4 as being inserted through the apertures of a stack of workpieces and is adapted to be raised by a hoist or the like (not shown) for the handling of workpieces adapted to be removed from or added to the transfer mechanism.

The operation of the mechanism of the present invention will be better understood by reference to FIGS. 15 and 16. Prior to use of the mechanism, the motor 33 is first turned on by a manual operation of a switch 118 which energizes a starter relay 33a for the motor 33 and thus provides for continuous reciprocation of the shuttle 27. As indicated in FIG. 16, switches 101 and 102 may then be closed to establish a potential across conductors 103 and 104 from a step-down transformer 105. Ground indicating lights 106 and 107 indicate that the electrical system is properly grounded. The mechanism is then ready to receive workpieces descending from the chute 44. As the workpieces fall onto the platform 45, the actuating arm of a limit switch LS2 is adapted to be moved to cause its normally open contacts to close and establish a circuit between conductors 103 and 104 through the field of relay R2. The energizing of relay R2 causes its normally open contacts R2a to close and thereby energizes solenoid S2. Solenoid S2 is operatively connected to one end of the spool of a four-way valve 108, which supplies air under pressure to the work receiving platform cylinder 48. Energizing the solenoid S2 effects movement of the spool of valve 108 to a position wherein air is supplied to the top of the piston of cylinder 48 to lower the platform 45. Simultaneously with the actuation of the valve 108, contacts R2b are closed to energize solenoid S22 which actuates the spool of a metering valve 109 supplying hydraulic fluid to a cylinder 110. The valve 109 and cylinder 110 may constitute a "Bellows Hydro-Check" unit in which the rate of movement of the piston rod 111 of the cylinder 110 is controlled by restricting the flow of fluid moving through the valve 109 from one end of the cylinder 110 to the other. The piston rod 111 is mechanically locked to the piston rod 47 by a linkage 112 and the cylinder 110 thus regulates and controls the rate of movement of the platform 45, which would otherwise be unduly rapid and difficult to control under the power supplied by the air cylinder 48.

As the platform 45 descends, the topmost workpiece thereon will shortly clear below the actuating arm of the limit switch LS2 permitting the arm to return to its normal position in which its contacts and the solenoids S2 and S22 are thereby deenergized. The spool of valve 108 will remain in the position to which it was actuated by solenoid S2 but valve 109 will be spring closed to prevent further movement of hydraulic fluid to or from the cylinder 110, and because of the relative incompressibility of the hydraulic fluid, further downward movement of the platform 45 will be retarded. However, when additional workpieces fall onto the platform 45, the limit switch LS2 will again be actuated and the above process successively repeated until a predetermined number of workpieces have been dropped onto the platform 45. This number is determined by the manual setting of a counter 113 mounted on the chute 44 in a position to be tripped upon the passage of each workpiece thereby. When the selected number of workpieces have been counted, a switch 114 incorporated in the counter will be actuated after a short time delay (sufficient to permit the last workpiece to come to rest on the stack) to open the circuit through contact $a$ thereof and close the circuit through contact $b$ thereof. This provides a circuit for energizing R2, which effects complete downward travel of the platform 45 to bring the stack of workpieces on the platform to rest on the rails 23 and 24 in position A. When in this position, the stack actuates a limit switch LS1 to cause the normally closed contacts thereof to open for preventing the energization of relay R1 until the stack has been removed from position A. The movement of switch 114 opens its contacts to deenergize relay R3 and cause its contacts R3b to return to their normally open positions. Previously, the contacts R3b were closed by the energization of relay R3 to energize solenoid S3. Solenoid S3 is operatively connected to the spool of a valve 117 which supplies air to the gate cylinder 97. The deenergizing of solenoid S2 permits the valve 117 to spring return to a position causing retraction of piston rod 96 and opening of the gate 52. As soon as the stack has been lowered to position A, it is thus ready to be moved from position A by means of the dog 63a, which is held in a raised position adapted to engage the stack by means of the air cylinder 70. The cylinder 70 is actuated to a position raising the dog 63a through a valve 115, operated by a solenoid S4. The solenoid S4 is energized through the closure of contacts R4b upon the energization of relay R4. The relay R4 is adapted to be energized through normally closed contacts R3c and a limit switch LS5, the contacts of which remain closed except when a stack of work is disposed in position B. The contacts R3c continue to remain closed until relay R3 is energized. However, the relay R3 was deenergized by the movement of the counter switch 114 to open the contacts $b$ thereof.

Upon the lowering of platform 45 to the position shown in FIG. 15, the platform 45 directly actuates a limit switch LS3 to cause the opening of its normally closed contacts. This prevents premature energizing of relay R3 should the machine operator reset the counter 114 to close contacts $b$ prior to the time that the platform 45 has been raised. Otherwise, the energizing of relay R3 would cause its contacts R3e to open and prevent the energizing of relay R1, which is used to effect lifting of the platform 45 to receive a new stack of workpieces, as will be more fully explained hereinafter.

It should be noted that during the reciprocation of the shuttle, all of the dogs 63a, 63b, etc., which are in a raised position, are adapted to be cammed or moved downwardly upon the rearward reciprocation of the shuttle by contact with a stack of workpieces which may be in the positions intended to be evacuated by said dogs. Thus, all of the dog fingers 64 are free to slide across the bottom of the lowermost workpiece in a stack thereabove during the rearward stroke of the shuttle and when the dog fingers 64 have moved slightly rearwardly of the stack adapted to be moved thereby the fingers 64 will be free to pivot upwardly under the influence of the weight of the dog arms 66.

After a stack of workpieces has been moved from position A, the limit switch LS1 will be free to return to a position with its contacts closed. Thus, the relay R1 is ready to be energized through still closed contacts R3e upon the closure of contacts R5a. This is accomplished by energizing relay R4 through the closure of the contacts of limit switch LS6, which is actuated by a cam 116 carried by the shuttle 27 in a position adapted to momentarily actuate the limit switch LS6 at the beginning of the rearward reciprocation thereof. The relay R5 establishes a holding circuit for itself through contact R5d so that the opening of the contacts of limit switch LS6 upon the continued rearward movement of the shuttle will not deenergize relay R5. Thus, the limit switch LS6 ensures that the platform will not be raised until the stack is fully clear of the platform and has been brought to rest in position B. The energization of relay R1 causes closure of its contacts R1a and the energization of solenoid S1. Solenoid S1 is operatively connected to the spool of valve 108, in opposition to the solenoid S2. The energizing of solenoid S1 shifts the spool of valve 108 to a position in which air is supplied to the bottom side of the piston of the cylinder 48 and causes the platform 45 to be raised to its uppermost position ready to receive a new stack of workpieces from the chute 44. The piston of the hydraulic cylinder 110 incorporates a unidirectional valve which permits the piston to rise unrestrictedly. In other words, the cylinder 110 acts to limit movement of the platform 45 in a downward direction only.

When raised to receive a new stack of work, the platform 45 frees the limit switch LS3, permitting its contacts to close and the machine operator should manually reset the counter switch 114 to position B. Thus, the relay R3 is again ready to be controlled by limit switch LS2 and switch 114 for regulating the descent of the platform 45.

From position B, the stack of workpieces will be successively advanced through positions C and D to position E by means of the dogs 63b, 63c and 63d, which are held in a raised position by the levers 68b, 68c and 68d, if there are no stacks of workpieces resting in the positions adaped to be fed by said dogs. Upon the arrival of the stack of workpieces in position E, the stack will be advanced to the final position F by the dogs 63e, which are held in a raised position by the cylinder 81, if the platform 54 is lowered to receive a new stack and position F is clear of workpieces. The cylinder 81 is controlled by a valve 118 which is operated by a solenoid S6. Solenoid S6 is energized through contacts R6b which are held closed through the energization of relay R6. Relay R6 is energized through the contacts LS7a of a limit switch LS7 which is actuated by the platform 54 when in a lowered position and through contacts a of limit switch LS27 which are normally closed when position F is free of workpieces. Upon the movement of the stack into position F, the limit switch LS27 will be actuated to open contacts a and close contacts b. As the shuttle begins its rearward movement after delivering a stack to position F, limit switch LS6 will be momentarily closed to energize relay R5 which establishes a holding circuit for itself through contacts R5d. The energizing of relay R5 causes its contacts R5b to close to establish a circuit through the contacts LS27b to energize relay R7. This, in turn, produces closure of contacts R7a to energize solenoid S7. Solenoid S7 is operatively connected to a valve 119 which controls the work dispensing air cylinder 56 to apply a force tending to raise the platform 54. As may be seen in FIG. 15, a hydraulic cylinder 120 is positioned adjacent the air cylinder 56 and is provided with a piston rod 121 mechanically locked to the piston rod 55 by means of a linkage 122. The cylinder 120 is preferably a "Hydro-Check" unit of the type indicated at 110 and is provided with a controlling valve 123 which is arranged to regulate the rate of ascent of the platform 54. The valve 123 is operated by a solenoid S8 which is energized by closure of contacts R8a in response to the energizing of relay R8. The relay R8 is adapted to be energized through the contacts of limit switch LS27, which remain closed when the pusher member 53 is held in a retracted position and through the contacts a of the limit switch LS9. When the uppermost workpieces of the stack engage the limit switch LS9, however, the contacts a thereof open and the contacts b thereof close to deenergize the relay R8 and the solenoid S8 and thus permit the spool of valve 123 to spring return to a position in which the flow of fluid through the cylinder 120 is blocked. The relay R9 is energized through contacts LS9b and R11a to energize solenoid S9 through now closed contacts R9c. It should be noted, however, that if a workpiece still remains on the platform 58 of the work receiving station, it will actuate limit switch LS12 mounted thereon to close its contact and energize relay R11. This opens contacts R11a to prevent energizing of relay R9. When the platform 58 is clear, however, relay R9 and solenoid S9 will be energized. Solenoid S9 is operatively connected to a valve 124 which regulates the flow of air to a cylinder 125 which powers the pusher member 53. The energizing of solenoid S9 actuates the valve 124 to a position in which the pusher member 53 is caused to advance into contact with the uppermost pair of workpieces resting on the platform 54 and push said workpieces off of the stack and onto the receiving platform 58 of the second work station. It will, of course, be appreciated that the pusher member 53 can be designed to slide the workpieces off of the platform individually, three at a time, or in any desired number in accordance with the requirements of the work receiving station. As the top workpieces are removed from the stack, the actuating arm of the limit switch LS9 will be released to reopen the contacts b and close the contacts a thereof. However, a holding circuit has been established for relay R9 by closure of contacts R9a thereof. When the workpieces fall onto the receiving platform of the second work station, they actuate the limit switch LS12 to energize the relay R11 which opens contacts R11a to interrupt the circuit to relay R9. This deenergizes the solenoid S9 to permit the valve 124 to spring return to a position causing the cylinder 125 to retract the pusher member 53 to its rearmost position. Upon the retraction of the pusher member 53 the limit switch LS29 will again be actuated to close its normally open contacts. Inasmuch as the contacts a of limit switch LS9 are also closed, as a result of the removal of the uppermost workpieces in contact therewith, a circuit is again established energizing the relay R8 to reenergize solenoid S8 and actuate the valve 123 to a position permitting gradual upward movement of the platform 54 under the power of cylinder 56. When the uppermost workpieces again contact the limit switch LS9 to open the contacts a thereof and close the contacts b, relay R9 will be energized to reenergize solenoid S9, actuate valve 124 and again advance the pusher member 53. This process is successively repeated until the final workpieces are cleared above a pair of supporting ledges 126 and 127 carried by a pair of posts 128 and 129, respectively. The posts 128 and 129 are pivotally supported and are biased inwardly at their upper ends by means of a pair of springs 130 and 131. However, the inner edges of the ledges 126 and 127 are upwardly and inwardly inclined and the upwardly moving stack of workpieces on the platform merely wedges the ledges outwardly as it advances upwardly. However, when the final workpieces are disposed above the ledges 126 and 127, said ledges are free to move inwardly and under said final workpieces to provide support for the final workpieces in alignment with the pusher member 53 and permit immediate retraction of the platform 54 to receive a new stack of workpieces. As the ledge 126 moves inwardly, it releases the actuating arm of a limit switch LS11 to permit its contacts to close and to establish an energizing circuit for relay R10 through contacts LS7b. The energizing of relay R10 effects closure of its contacts R10a to energize solenoid S10. Solenoid S10 is operatively connected to the valve 119 in opposition to the solenoid S7 and serves to move the spool of the valve 123 from the position to which it was moved by the energizing of solenoid S7 to a position in which the piston rod 155 is caused to retract and the platform 54 is lowered. The "Hydro-Check" cylinder 120 is so constructed as to incorporate valve means in the piston thereof permitting the unrestricted lowering of its piston. In other words, the "Hydro-Check" cylinder 120 is only operative to restrict the movement of the piston rod 55 in one direction, that is, the upward direction. When the platform 54 resumes its lowermost position, it again actuates limit switch LS7 to close its contacts LS7b and establish a circuit through contacts LS7a and LS27a to energize relay R6, which, in turn, reenergizes solenoid S6 to raise the dog 63e to a position in which it is operable to advance a new stack of workpieces from position E to position F. In the meantime, the remaining workpieces resting on the ledges 126 and 127 are removed therefrom by operation of the pusher member 53, as hereinbefore described, and the process is again repeated to lift the platform 54 to advance a new stack of workpieces resting in position F upwardly, wedging the ledges 126 and 127 outwardly as they move thereby and bringing the uppermost workpieces on the stack just high enough to contact the actuating arm of limit switch LS9.

It will be noted that as workpieces are successively fed onto the rails from the initial position A, each stack of workpieces will continue to advance down the rails 23 and 24 until they arrive in a position in which the next adjacent position is already occupied by a stack of workpieces. The workpieces will then rest in that position until the next adjacent position has been evacuated. Thus, all stacks of workpieces fed into the mechanism of the present invention will be successively advanced through the transfer mechanism until all workpieces thereon have been fed to the receiving or second work station.

Although not indicated on the drawings, each of the air valves for controlling the air cylinder is connected to a suitable source of pressurized air. The hydraulic cylinder and valve unit 109 and 110 and the units 120 and 123 are separate, self-contained units in which the oil is merely recirculated from one end of the cylinder to the valve and then to the opposite end of the cylinder again.

In practice, a machine embodying the principles of the present invention has been constructed for handling workpieces which each weigh approximately 40 pounds. The particular machine built had a shuttle stroke of thirty-three inches, which was just several inches longer than the diameter of the workpieces, and the shuttle made a complete reciprocation once each eighteen seconds. It will thus be seen that the mechanism of the present invention provides means for expeditiously handling large, heavy and cumbersome material.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. In a transfer mechanism, a supporting structure having an elongated work supporting surface, a reciprocable shuttle associated with said supporting structure, a plurality of pusher members pivotally mounted on said shuttle for moving work supported on said supporting surface, said pusher members being individually movable between a position projecting above and a position disposed entirely below said supporting surface, at least one lever pivoted on said shuttle provided with means projecting above the level of said supporting surface for actuation of said lever on contact with work in a predetermined position on said supporting surface, at least one of said pusher members having means engageable with said lever whereby when said lever is actuated by contact with the work in the predetermined position, said pusher member will be moved to its position beneath said work-supporting surface.

2. A transfer mechanism comprising a supporting structure having an elongated work supporting surface, a shuttle associated with said supporting structure for moving work from a first position to a final position successively through a plurality of intermediate positions, a first pusher member mounted on said shuttle for moving work from said first position to a first intermediate position, switch means actuated by the presence of work in said first intermediate position, and power means for moving said first pusher member beneath the level of said supporting surface in response to said switch mechanism, a plurality of additional pusher members for moving work from each of said intermediate positions to a next adjacent position, said additional pusher members being movable between positions above and below said work supporting surface, and lever means pivotally mounted on said shuttle, said lever means being actuated by contact with work in the positions adapted to be fed by the additional pusher members controlled thereby, at least some of said additional pusher members having means engageable with said lever means when said lever means is actuated by contact with said work, whereby said additional pusher members are moved to their respective positions below said work-supporting surface when said lever means is actuated.

3. A transfer mechanism comprising a supporting structure having an elongated work supporting surface, a work receiving platform vertically movable to lower work onto a first position on said supporting surface, a shuttle associated with said supporting structure for moving work from said first position to a final position successively through a plurality of intermediate positions, a first pusher member mounted on said shuttle for moving work from said first position to a first intermediate position, switch means actuated by the presence of work in said first intermediate position, and power means for moving said first pusher member beneath the level of said supporting surface in response to said switch mechanism, a plurality of additional pusher members for moving work from each of said intermediate positions to a next adjacent position, said additional pusher members being movable between positions above and below said work supporting surface, lever means pivotally mounted on said shuttle, said lever means being actuated by contact with work in the positions adapted to be fed by the additional pusher members controlled thereby, at least some of said additional pusher members having means engageable with said lever means when said lever means is actuated by contact with said work, whereby said additional pusher members are moved to their respective position below said work supporting surface when said lever means is actuated, and a vertically movable platform for removing work from said final position.

4. In a transfer mechanism, a supporting structure comprising a pair of spaced, parallel rails having smooth work supporting surfaces on which work is adapted to be slidably moved, a shuttle disposed between said rails, and a plurality of pusher members carried by said shuttle, means for individually actuating said pusher members between positions above and below said rails in response to the presence of work in the positions fed by said pusher members, each of said pusher members having spaced fingers provided with inwardly and rearwardly converging shoulders adapted to engage the work on opposite sides thereof and maintain the work generally centered relative to said fingers.

5. In a transfer mechanism, a supporting structure having means providing an elongated work supporting surface, a shuttle associated with said supporting structure having a pair of spaced, parallel, elongated side frame members and cross rod members rigidly interconnecting said side frame members, at least one pusher member pivotally mounted on one of said cross rods and pivotable to a position projecting above said supporting surface for engaging and moving work resting on said supporting surface, and a lever arm pivoted on a cross rod next adjacent to a cross rod on which said at least one pusher member is pivoted, said lever arm projecting at one end above said supporting surface for pivotal movement upon engagement with work in the position to which work is supplied by said at least one pusher member, means associated with said pusher member engageable with said lever arm whereby when said lever arm is pivoted upon engagement with the work, said pusher member is pivoted to a position beneath the level of the work-supporting surface.

6. In a transfer mechanism, a supporting structure having an elongated work supporting surface, a reciprocable shuttle associated with said supporting structure, a plurality of pusher members pivotally mounted on said shuttle at longitudinally spaced locations therealong, said pusher members having portions projecting above the level of said supporting surface for moving workpieces along said supporting surface, said pusher members being arranged for individual pivotal movement, a plurality of levers pivotally mounted on said shuttle independently of said pusher members, each of said levers having one end portion thereof projectable above the level of said supporting surface for engagement with an article on said work supporting surface, means associated with each said pusher member engageable with an opposite portion of an associated one of said levers whereby upon engagement of any one of said levers with an article on said work-supporting surface upon reciprocation of said shuttle, an associated one of said pusher members will be pivoted to a position below said supporting surface.

7. In a transfer mechanism a supporting structure having an elongated work supporting surface, a reciprocable shuttle associated with said supporting structure, a plurality of pusher members mounted on said shuttle for independent pivotal movement at longitudinally spaced locations therealong, said pusher members having work engaging portions normally projecting above the level of said supporting surfaces and arm portions on the opposite sides of the pivotal axes thereof of a weight sufficient normally to maintain such work engaging portions above the level of said supporting surface, a plurality of levers pivotally mounted on said shuttle independently of such pusher members, each of said levers having an upwardly projecting portion at one end thereof normally extending above the level of said supporting surface and an opposite end portion, means on said arm portions of each of said pusher members engageable with said opposite end portion of their associated levers respectively, the upwardly projecting portions of said levers being engageable with articles moved into given positions on said work supporting surface upon rearward movement of said shuttle to cause pivoting of said levers and the consequent movement of the associated pusher members to positions beneath the level of said supporting surface.

References Cited in the file of this patent
UNITED STATES PATENTS

| | | |
|---|---|---|
| 1,437,410 | Evans et al. | Dec. 5, 1922 |
| 1,559,199 | Straight | Oct. 27, 1925 |
| 1,668,530 | Romine | May 1, 1928 |
| 1,772,734 | Romine | Aug. 12, 1934 |
| 2,550,523 | Borgerding | Apr. 24, 1951 |
| 2,583,968 | Rosseau | Jan. 29, 1952 |
| 2,838,165 | Groll | June 10, 1958 |
| 3,000,489 | Poel | Sept. 19, 1961 |